US012600194B2

(12) United States Patent  
Han et al.

(10) Patent No.: US 12,600,194 B2  
(45) Date of Patent: Apr. 14, 2026

(54) AIR CONDITIONER DEVICE FOR A VEHICLE

(71) Applicants: HYUNDAI MOTOR COMPANY, Seoul (KR); KIA CORPORATION, Seoul (KR); DOOWON CLIMATE CONTROL CO., LTD., Asan-si (KR)

(72) Inventors: Kwang Ok Han, Seoul (KR); Young Tae Song, Gwangmyeong-si (KR); Yong Chul Kim, Hwaseong-si (KR); Gee Young Shin, Suwon-si (KR); Su Yeon Kang, Seoul (KR); Jae Sik Choi, Suwon-si (KR); Dae Hee Lee, Incheon (KR); Byeong Moo Jang, Suwon-si (KR); Ung Hwi Kim, Hwaseong-si (KR); Jae Won Cha, Pyeongtaek-si (KR); Won Jun Joung, Uiwang-si (KR); Byung Guk An, Asan-si (KR)

(73) Assignees: HYUNDAI MOTOR COMPANY, Seoul (KR); KIA CORPORATION, Seoul (KR); DOOWAN CLIMATE CONTROL CO., LTD., Asan-si (KR)

( * ) Notice: Subject to any disclaimer, the term of this patent is extended or adjusted under 35 U.S.C. 154(b) by 498 days.

(21) Appl. No.: 18/118,924

(22) Filed: Mar. 8, 2023

(65) Prior Publication Data

US 2024/0092141 A1 Mar. 21, 2024

(30) Foreign Application Priority Data

Sep. 20, 2022 (KR) ........................ 10-2022-0118750

(51) Int. Cl.  
*B60H 1/00* (2006.01)

(52) U.S. Cl.  
CPC ................................ *B60H 1/00671* (2013.01)

(58) Field of Classification Search  
USPC ..................................................... 454/69–165  
See application file for complete search history.

(56) References Cited

U.S. PATENT DOCUMENTS 10,611,207 B2 * 4/2020 Ryu ........................ B60H 1/22  
11,001,125 B2 5/2021 Goodfellow  
(Continued)

FOREIGN PATENT DOCUMENTS

JP 2007069770 A 3/2007  
KR 20220024940 A 3/2022

*Primary Examiner* — Ko-Wei Lin  
(74) *Attorney, Agent, or Firm* — Lempia Summerfield Katz LLC

(57) ABSTRACT

An air conditioning device for a vehicle includes: a housing having an inside divided into an inflow space, a heat exchange space, and an outflow space, which are straightly arranged, and having a plurality of discharge ports, which communicates with an interior, at the inflow space; a blowing unit disposed at the inflow space of the housing and configured to blow air; a heat exchange unit disposed at the heat exchange space of the housing and configured to adjust a temperature of conditioned air by exchanging heat with air; and an opening-closing door disposed at the outflow space of the housing and configured to open and close the plurality of discharge ports such that conditioned air at an adjusted temperature selectively flows to the plurality of discharge ports. The air conditioning device adjusts the temperature of conditioned air for respective modes and reduces a flow resistance of air.

18 Claims, 11 Drawing Sheets

(56)          References Cited

U.S. PATENT DOCUMENTS

| | | | |
|---|---|---|---|
| 2012/0248205 A1* | 10/2012 | Klinkhammer .... | B60H 1/00685 |
| | | | 454/143 |
| 2013/0319630 A1* | 12/2013 | Yamamoto ......... | B60H 1/00021 |
| | | | 165/42 |
| 2014/0080398 A1* | 3/2014 | Tabei ................. | B60H 1/00849 |
| | | | 454/75 |
| 2017/0106716 A1* | 4/2017 | Hirai .................. | B60H 1/00028 |
| 2017/0203631 A1* | 7/2017 | Ryu ......................... | B60H 1/22 |
| 2018/0126820 A1* | 5/2018 | Makimoto ......... | B60H 1/00564 |
| 2018/0194190 A1* | 7/2018 | Kim ......................... | B60H 1/22 |
| 2018/0312029 A1* | 11/2018 | Ito ..................... | B60H 1/00064 |
| 2020/0055365 A1* | 2/2020 | You .................... | B60H 1/00899 |
| 2021/0001682 A1 | 1/2021 | Schnaidt et al. | |
| 2021/0061062 A1* | 3/2021 | Yamamoto ......... | B60H 1/00671 |
| 2022/0024276 A1 | 1/2022 | Mullett | |
| 2023/0086817 A1* | 3/2023 | You ......................... | B60H 3/06 |
| | | | 62/244 |
| 2023/0373266 A1* | 11/2023 | Fujita ................. | B60H 1/00464 |

* cited by examiner

AIR CONDITIONER DEVICE FOR A VEHICLE

CROSS REFERENCE TO RELATED APPLICATION

The present application claims priority to Korean Patent Application No. 10-2022-0118750, filed on Sep. 20, 2022, the entire contents of which are incorporated herein by reference.

BACKGROUND

Field

The present disclosure relates to an air conditioning device for a vehicle and, more particularly, an air conditioning device for a vehicle in which the number of doors for adjusting a temperature of conditioned air for respective modes and a flow resistance of air is reduced by improving airflow.

Description of the Related Art

Recently, an eco-friendly technology implemented in an electric vehicle to solve problems such as energy exhaustion has become more popular mainly due to various environmental advantages. Such an electric vehicle is driven by a motor with electric energy supplied from a battery and outputs driving power. Accordingly, the electric vehicle has advantages of not discharging carbon dioxide, generating a little noise, and having higher energy efficiency of a motor than the energy efficiency of an engine, so it has been spotlighted as an eco-friendly vehicle.

The core technology for achieving such an electric vehicle is the technology related to a battery module, and recently, studies for reducing the weight and size of a battery and decreasing the charge time have been actively conducted. A battery module can maintain optimal performance and a long lifespan when it is used in an optimal temperature environment. However, it is substantially difficult to use a battery module in an optimal temperature environment due to heat generated in operation and a change of external temperature.

Further, a general engine such as an internal combustion engine generates waste heat during a combustion process in the engine, whereas an electric vehicle has no waste heat source. Thus, the interior of the electric vehicle is heated with an electric heating device in wintertime. Further, warming-up is required to improve the charge/discharge performance of a battery of the electric vehicle in an intense cold period, so a separate cooling water heating-type electric heater is used. In other words, the electric vehicle needs to have a heating/cooling system for controlling the temperature of a battery module separately from a heating/cooling system for interior air-conditioning of the vehicle in order to maintain an optimal temperature environment for the battery module.

However, we have found that a flow resistance of air in the vehicle increases because the flow direction of air is changed due to a limited installation space for and a large size of such an air conditioning device (i.e., a heating/cooling system for controlling interior air-conditioning of the vehicle). Further, since several temperature adjustment doors are used to adjust the temperature of conditioned air that is provided in an interior or to control the position for providing conditioned air to an interior and a motor is provided for each of the temperature adjustment doors, there is a problem that the manufacturing cost and the weight are increased.

The description in the BACKGROUND section is provided just to help understanding of the background of the present disclosure and should not be construed as being included in the related art known by those having ordinary skill in the art.

SUMMARY

The present disclosure has been made in an effort to solve the problems and an objective of the present disclosure is to provide an air conditioning device for a vehicle in which the number of doors for adjusting the temperature of conditioned air for respective modes and flow resistance of air is reduced by improving airflow.

In one embodiment of the present disclosure, an air conditioning device for a vehicle includes: a housing having an inside divided into an inflow space, a heat exchange space, and an outflow space, which are straightly arranged, and having a plurality of discharge ports, which communicates with an interior, at the inflow space; a blowing unit disposed at the inflow space of the housing and configured to blow air; a heat exchange unit disposed at the heat exchange space of the housing and configured to adjust temperature of conditioned air by exchanging heat with air; and an opening-closing door disposed at the outflow space of the housing and configured to open and close the discharge ports such that conditioned air with an adjusted temperature selectively flows to the discharge ports.

The inflow space may be formed such that a cross-sectional area at an inlet is smaller than a cross-sectional area at an outlet, and a filter may be disposed at the inlet.

The heat exchange unit may include a heat exchanger and a heater and a cooling medium circulates in the heat exchanger, so temperature of conditioned air may be adjusted by heat exchange between the cooling medium and air, and the heater may be configured to increase temperature of conditioned air by generating heat.

The heat exchanger may be installed diagonally at an angle in the heat exchange space.

The discharge ports of the housing may include an interior upper vent hole and an interior lower vent hole, and the interior upper vent hole and the interior lower vent hole may be spaced apart from each other in opposite directions from a center of the outflow space.

An area of the interior upper vent hole may be larger than an area of the interior lower vent hole.

A bypass channel may be formed around the heater in the heat exchange space of the housing, so a portion of air that has passed through the heat exchanger may flow through the bypass channel rather than passing through the heater.

A bypass door may be installed in the bypass channel, so air that has passed through the heat exchanger may be bypassed without passing through the heater when the bypass door is open.

The bypass door may be opened when conditioned air flows cooled through the heat exchanger is supplied, and may be closed when conditioned air heated through the heater is supplied.

The opening-closing door may include a first door rotatably installed in the interior upper vent hole and a second door rotatably installed in the interior lower vent hole.

The first door may be opened and the second door may be closed when conditioned air is supposed to be supplied to the interior upper vent hole, the first door may be closed and the second door may be opened when conditioned air is supposed to be supplied to the interior lower vent hole, and the first door and the second door may be both opened when conditioned air is supposed to be supplied to both the interior upper vent hole and the interior lower vent hole.

A guide may extend toward the outflow space between the heater and the bypass channel in the housing, and may come in contact with the opening-closing door when the opening-closing door is positioned to close the bypass channel.

The guide may extend to curve along an external shape of the outflow space between the heater and the bypass channel.

The outflow space of the housing may be formed such that a width of a portion connected to the heat exchange space gradually decreases, so air that has passed through the heat exchange space may converge on a center, and the other section of the outflow space may be curved.

The opening-closing door may include a rotary shaft rotatably installed in the outflow space, and a first baffle and a second baffle that are hollow to pass air and are coupled to the rotary shaft at a predetermined distance therebetween.

The opening-closing door may be configured such that the second baffle closes the interior lower vent hole and opens the bypass channel when the first baffle opens the interior upper vent hole, and the second baffle opens the interior lower vent hole and closes the bypass channel when the first baffle closes the interior upper vent hole, and the bypass channel is closed when the first baffle and the second baffle partially open the interior upper vent hole and the interior lower vent hole, respectively.

When conditioned air is supposed to be supplied to the interior upper vent hole, the opening-closing door may be adjusted to a position at which the first baffle opens the interior upper vent hole and the second baffle closes the interior lower vent hole, whereby the bypass channel may be opened.

When conditioned air is supposed to be supplied to the interior lower vent hole, the opening-closing door may be adjusted to a position at which the first baffle closes the interior upper vent hole and the second baffle opens the interior lower vent hole, whereby the bypass channel may be closed.

When conditioned air is supposed to be supplied to both the interior upper vent hole and the interior lower vent hole, the opening-closing door may be adjusted to a position at which the first baffle and the second baffle partially open the interior upper vent hole and the interior lower vent hole, respectively, and the bypass channel is closed.

According to the air conditioning device for a vehicle having the structure described above, the number of doors for adjusting the temperature of conditioned air in each mode is reduced and flow resistance of air is reduced by improving airflow.

BRIEF DESCRIPTION OF THE DRAWINGS

The above and other objectives, features and other advantages of the present disclosure should be more clearly understood from the following detailed description when taken in conjunction with the accompanying drawings, in which.

DETAILED DESCRIPTION

Figure 1:
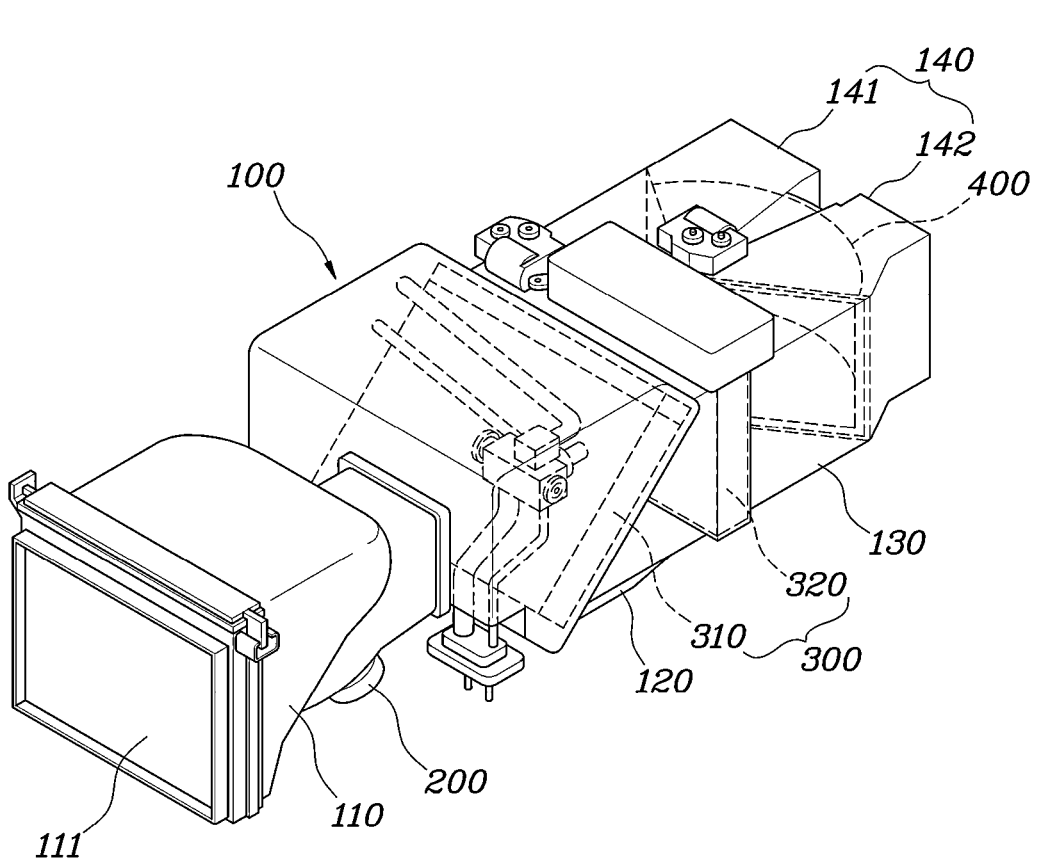
FIG. 1 is a view showing an air conditioning device for a vehicle according to an embodiment of the present disclosure.

Hereafter, embodiments of the present disclosure are described in detail with reference to the accompanying drawings and the same or similar components are given the same reference numerals regardless of the numbers of figures and are not repeatedly described.

Terms "module" and "unit" that are used for components in the following description are used only for the convenience of description without having discriminate meanings or functions.

In the following description, if it is decided that the detailed description of known technologies related to the present disclosure makes the subject matter of the embodiments described herein unclear, the detailed description is omitted. Further, the accompanying drawings are provided only for easy understanding of embodiments disclosed in the specification, the technical spirit disclosed in the specification is not limited by the accompanying drawings, and all changes, equivalents, and replacements should be understood as being included in the spirit and scope of the present disclosure.

Terms including ordinal numbers such as "first", "second", etc., may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element, having the other element intervening therebetween. On the other hand, it should be understood that when one element is referred to as being "connected directly to" or "coupled directly to" another element, it may be connected to or coupled to another element without the other element intervening therebetween.

Singular forms are intended to include plural forms unless the context clearly indicates otherwise. When a component, device, element, or the like of the present disclosure is described as having a purpose or performing an operation, function, or the like, the component, device, or element should be considered herein as being "configured to" meet that purpose or to perform that operation or function.

It should be further understood that the terms "comprise" or "have" used in this specification, specify the presence of stated features, steps, operations, components, parts, or a combination thereof, but do not preclude the presence or addition of one or more other features, numerals, steps, operations, components, parts, or a combination thereof.

A controller may include a communication device that communicates with another controller or a sensor to control corresponding functions, a memory that stores an operating system or logic commands and input/output information, and one or more processors that perform determination, calculation, decision, etc. for controlling the corresponding functions.

An air conditioning device for a vehicle according to exemplary embodiments of the present disclosure is described hereafter with reference to the accompanying drawings.

Figure 2:
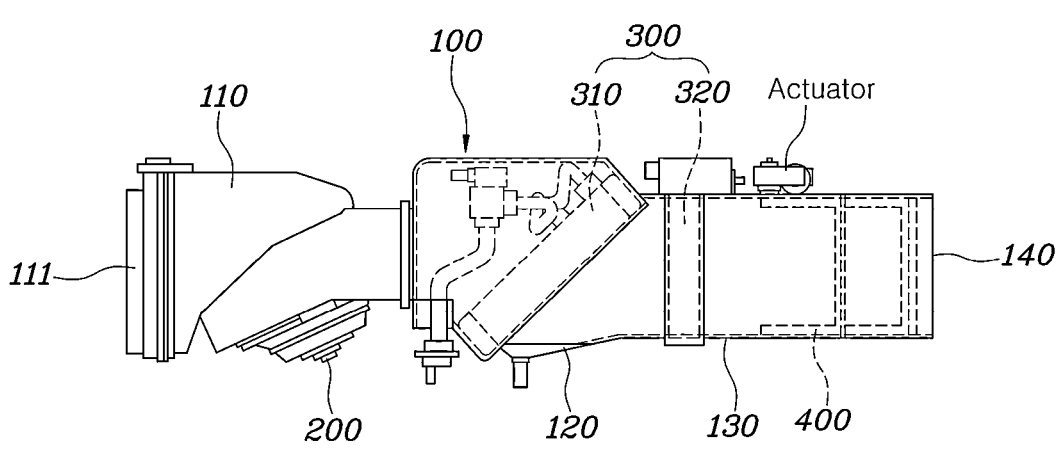
FIG. 2 is a side view of the air conditioning device shown in FIG. 1.

FIG. 1 is a view showing an air conditioning device for a vehicle according to one embodiment of the present disclosure, and FIG. 2 is a side view of the air conditioning device shown in FIG. 1.

Figure 3:
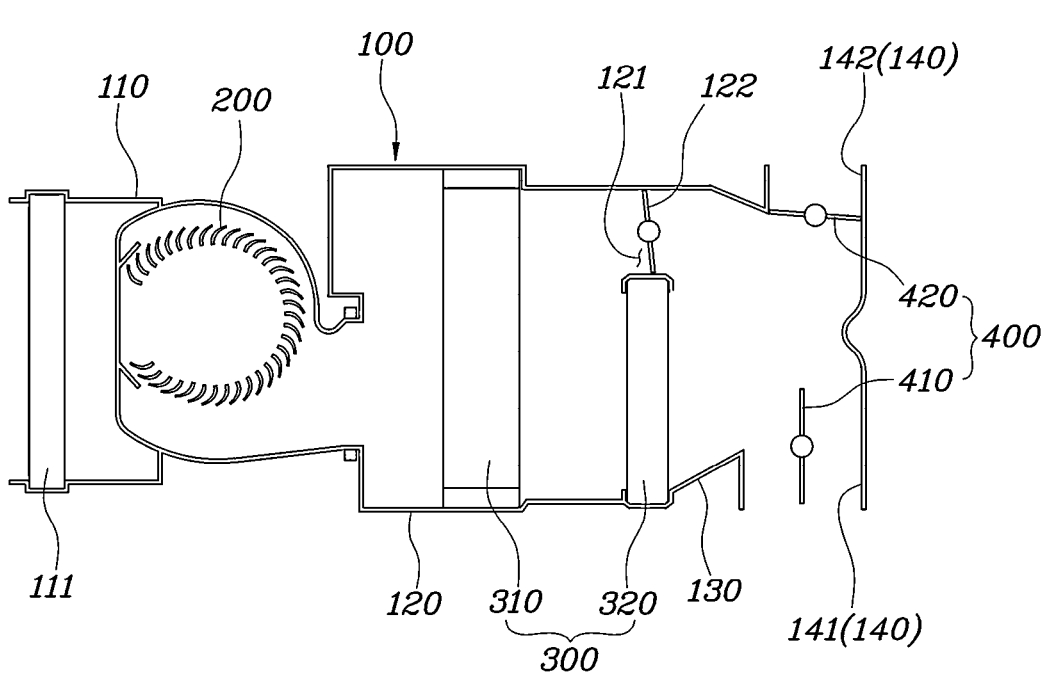
FIG. 3 is a view showing an air conditioning device for a vehicle according to an embodiment of the present disclosure.
Figure 4:
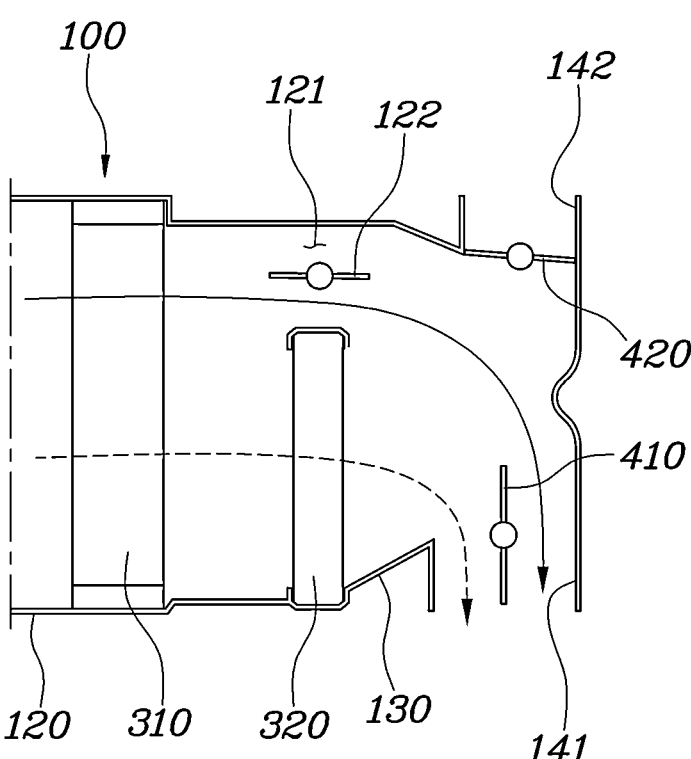
FIG. 4 is a view showing that conditioned air flows to an interior upper vent hole in the air conditioning device according to the embodiment shown in FIG. 3.
Figure 5:
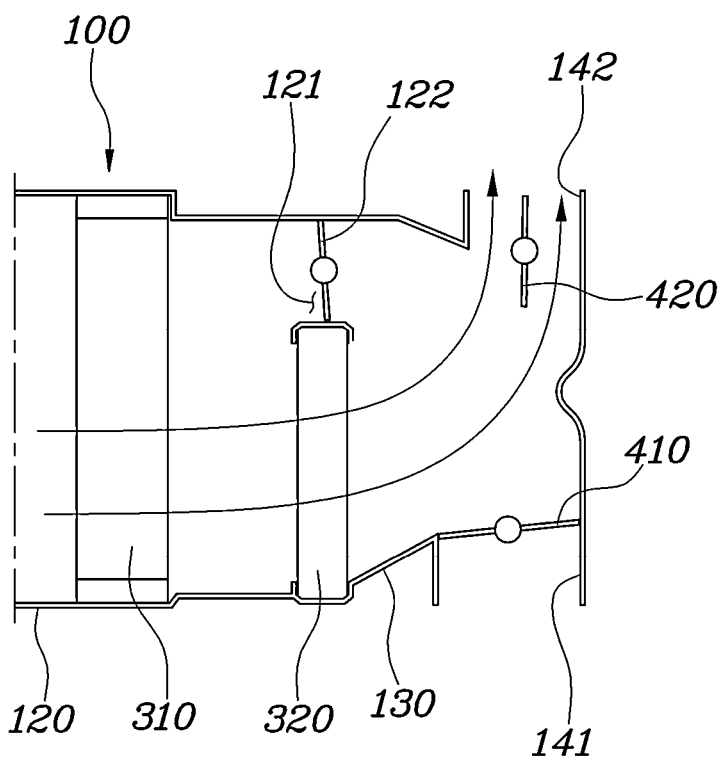
FIG. 5 is a view showing that conditioned air flows to an interior lower vent hole in the air conditioning device according to the embodiment shown in FIG. 3.
Figure 6:
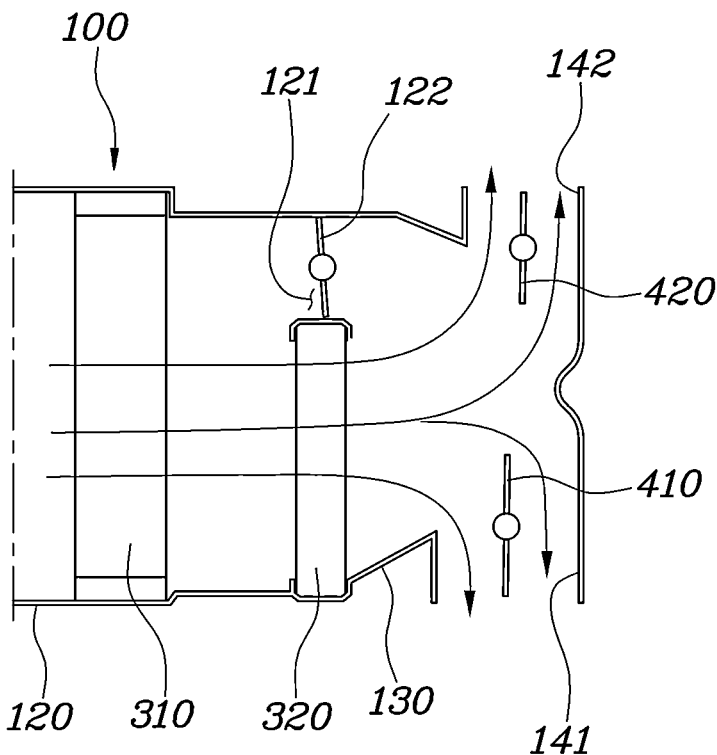
FIG. 6 is a view showing that air flows to both the interior upper vent hole and the interior lower vent hole in the air conditioning device according to the embodiment shown in FIG. 3.

FIG. 3 is a view showing an air conditioning device for a vehicle according to an embodiment of the present disclosure, FIG. 4 is a view showing that conditioned air flows to an interior upper vent hole in the air conditioning device for a vehicle according to an embodiment shown in FIG. 3, FIG. 5 is a view showing that conditioned air flows to an interior lower vent hole in the air conditioning device for a vehicle according to an embodiment shown in FIG. 3, and FIG. 6 is a view showing that air flows to both the interior upper vent hole and the interior lower vent hole in the air conditioning device for a vehicle according to an embodiment shown in FIG. 3.

Figure 7:
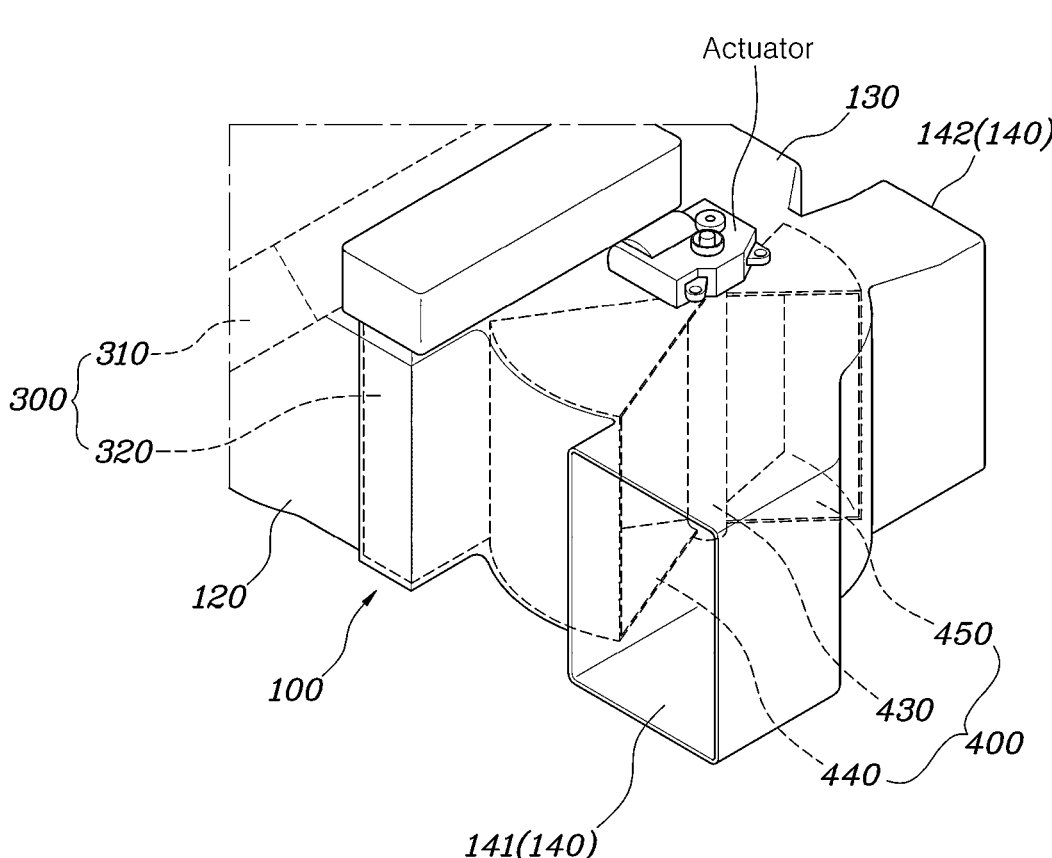
FIG. 7 is a view showing an air conditioning device for a vehicle according to another embodiment of the present disclosure.
Figure 8:
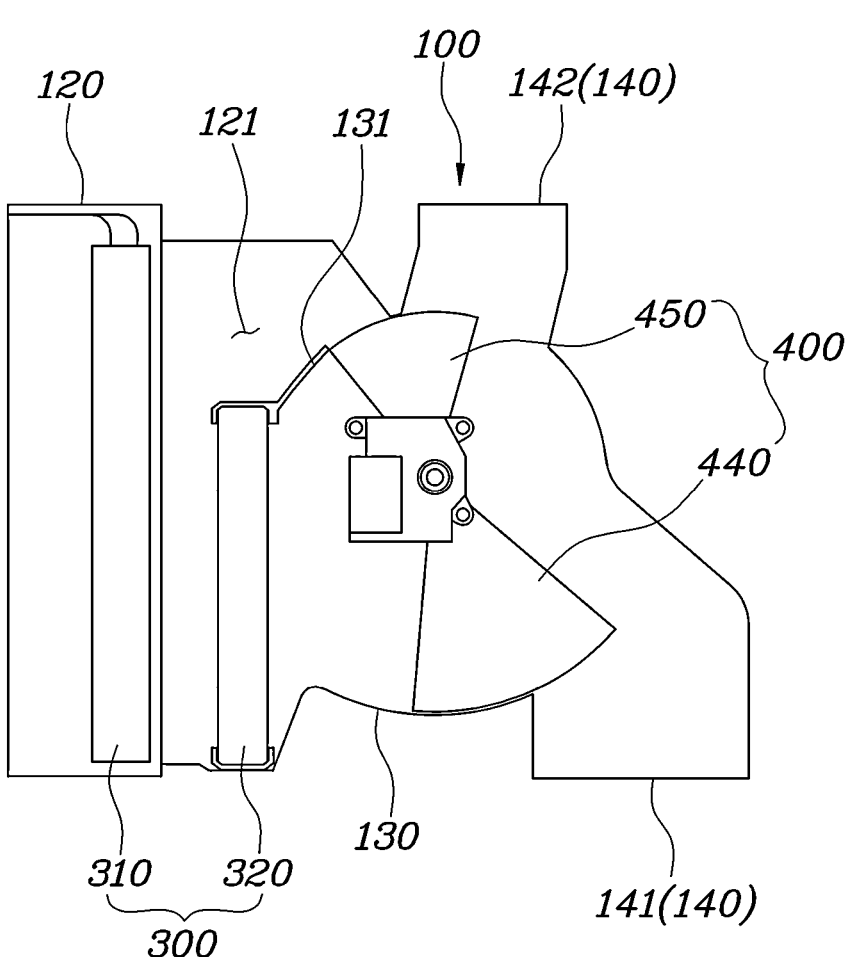
FIG. 8 is a view illustrating an opening-closing door of the air conditioning device according to the embodiment shown in FIG. 7.
Figure 9:
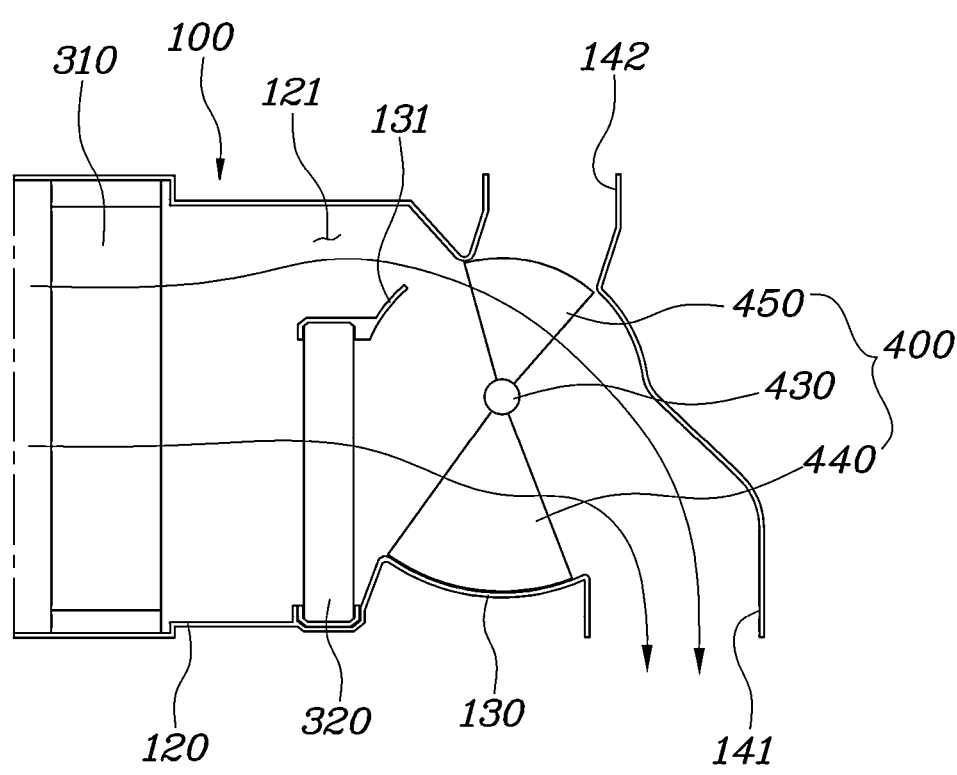
FIG. 9 is a view showing that conditioned air flows to an interior upper vent hole in the air conditioning device according to the embodiment shown in FIG. 7.
Figure 10:
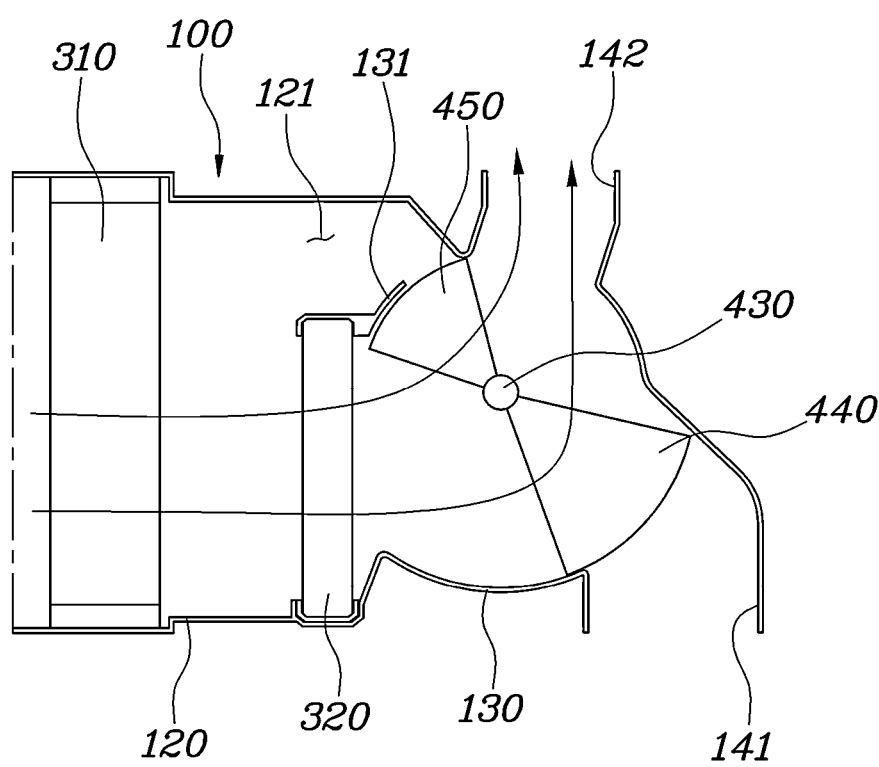
FIG. 10 is a view showing that conditioned air flows to an interior lower vent hole in the air conditioning device according to the embodiment shown in FIG. 7.
Figure 11:
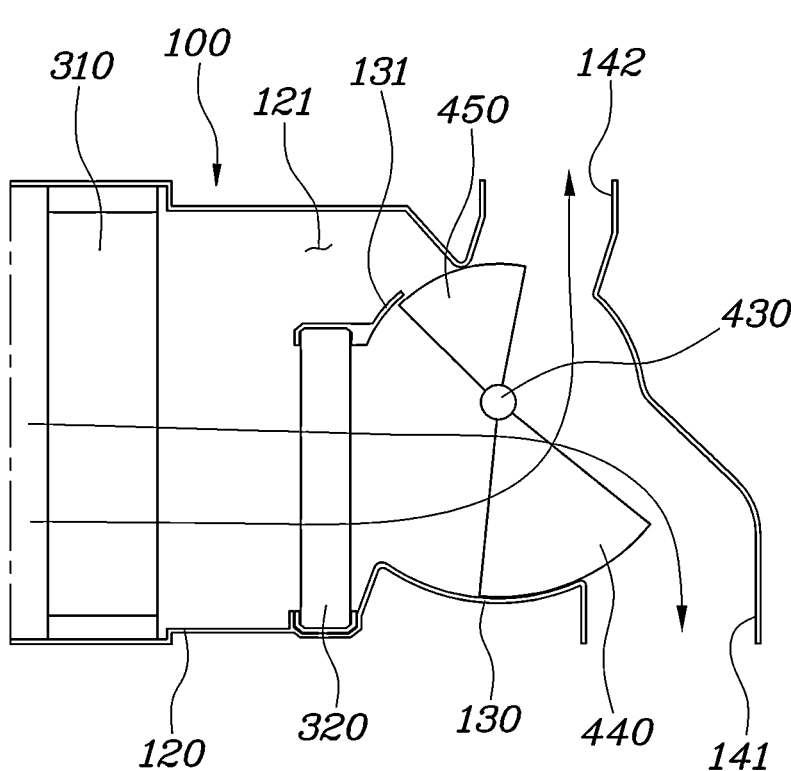
FIG. 11 is a view showing that air flows to both the interior upper vent hole and the interior lower vent hole in the air conditioning device according to the embodiment shown in FIG. 7.

FIG. 7 is a view showing an air conditioning device for a vehicle according to another embodiment of the present disclosure, FIG. 8 is a view illustrating an opening-closing door of the air conditioning device for a vehicle according to another embodiment shown in FIG. 7, FIG. 9 is a view showing that conditioned air flows to an interior upper vent hole in the air conditioning device for a vehicle according to another embodiment shown in FIG. 7, FIG. 10 is a view showing that conditioned air flows to an interior lower vent hole in the air conditioning device for a vehicle according to another embodiment shown in FIG. 7, and FIG. 11 is a view showing that air flows to both the interior upper vent hole and the interior lower vent hole in the air conditioning device for a vehicle according to another embodiment shown in FIG. 7.

As shown in FIGS. 1 and 2, an air conditioning device for a vehicle includes: a housing 100 having an inside divided into an inflow space 110, a heat exchange space 120, and an outflow space 130, which are straightly arranged, and having a plurality of discharge ports 140, which communicates with an interior, at the inflow space 110. The air conditioning device further includes: a blowing unit 200 disposed at the inflow space 110 of the housing 100 and configured to blow air; a heat exchange unit 300 disposed at the heat exchange space 120 of the housing 100 and configured to adjust a temperature of conditioned air by exchanging heat with air; and an opening-closing door 400 disposed at the outflow space 130 of the housing 100 and configured to open and close the discharge ports 140 such that the conditioned air at an adjusted temperature selectively flows to the discharge ports 140.

The present disclosure relates to a heating, ventilation, and air conditioning (HVAC) device including the blowing unit 200, the heat exchange unit 300, and the opening-closing door 400 in the housing 100, in which the temperature of air flowing through the blowing unit 200 is adjusted by the heat exchange unit 300 and the conditioned air at the adjusted temperature selectively flows to the discharge ports 140, depending on whether the opening-closing door 400 is open, whereby conditioned air is supplied to an interior.

The housing 100 is divided into the inflow space 110 at which the blowing unit 200 is disposed, the heat exchange space 120 at which the heat exchange unit 300 is disposed, and the outflow space 130 at which the opening-closing door 400 and the discharge ports 140 are disposed. In one embodiment, the inflow space 110, the heat exchange space 120, and the outflow space 130 are straightly arranged, so airflow is stabilized.

The housing 100 is configured in a flat type that straightly extends, making installation easy.

The housing 100 is configured such that the inflow space 110, the heat exchange space 120, and the outflow space 130 are separately manufactured to be assembled and disassembled, so convenience of installation of the blowing unit 200, the heat exchange unit 300, and the opening-closing door 400 is secured.

The inflow space 110 may be formed such that the cross-sectional area at the outlet is smaller than the cross-sectional area at the inlet, and a filter 111 may be disposed at the inlet.

Accordingly, when the blowing unit 200 in the housing 100 is operated, foreign substances are removed while air flowing in the inflow space 110 flows through the filter 111, and the airflow speed increases while the air is discharged to the outlet having a relatively small cross-sectional area.

As described above, the housing 100 includes the inflow space 110, the heat exchange space 120, and the outflow space 130. The temperature of the air that has passed through the filter 111 by operation of the blowing unit 200 is adjusted by the heat exchange unit 300 in the heat exchange space 120, and the discharge direction of the conditioned air at the adjusted temperature is determined by whether the door 400 in the outflow space 130 is open or closed, whereby conditioned air can or cannot flow into an interior.

The heat exchange unit 300 includes a heat exchanger 310 and a heater 320 and a cooling medium. The cooling medium circulates in the heat exchanger 310, so the temperature of conditioned air is adjusted by heat exchange between the cooling medium and air, and the heater 320 is configured to increase the temperature of conditioned air by generating heat.

The heat exchanger 310 is configured such that a cooling medium such as cooling water or a refrigerant circulates therein. In one embodiment, the heat exchanger 310 may be an evaporator that cools conditioned air using evaporation of a refrigerant of the vehicle.

In another embodiment, the heater 320 may be a PTC heater and heats conditioned air by generating heat whet it operates.

Accordingly, the heat exchange unit 300 can produce cooled conditioned air using the heat exchanger 310 and can produce heated conditioned air using the heater 320, and can variously adjust the temperature of conditioned air by mixing cooled conditioned air and heated conditioned air.

The heat exchanger 310 may be installed diagonally at an angle in the heat exchange space 120. When the heat exchanger 310 is installed diagonally at an angle, it is possible to secure a space for the heat exchanger 310 in the limited heat exchange space 120, so it is possible to increase cooling efficiency by the heat exchanger 310 in the heat exchange space 120.

The discharge ports 140 of the housing 100 include an interior upper vent hole 141 and an interior lower vent hole 142, and the interior upper vent hole 141 and the interior lower vent hole 142 may be spaced apart from each other in opposite directions from the center of the outflow space 130.

The interior upper vent hole 141 may be configured such that conditioned air is discharged toward the upper body of a passenger and the interior lower vent hole 142 may be configured such that conditioned air is discharged toward the lower body of a passenger. The present disclosure may be applied to a HVAC for rear seats, and in this case, the interior upper vent hole 141 may be configured such that air is discharged to the space over the rear seats and the interior lower vent hole 142 may be configured such that air is discharged to the space under the rear seats.

In particular, since the interior upper vent hole 141 and the interior lower vent hole 142 are spaced apart from each other, the air that is discharged through the interior upper vent hole 141 and the air that is discharged through the interior lower vent hole 142 are not biased to any one side and can flow in an intended directions of the interior upper vent hole 141 and the interior lower vent hole 142, depending on an opening position of the opening-closing door 400.

The interior upper vent hole 141 and the interior lower vent hole 142 are spaced apart from each other in opposite directions from the center of a rear seat space, whereby air is prevented from being biased to any one side and being excessively discharged even in a situation in which air is supposed to be discharged from both the interior upper vent hole 141 and the interior lower vent hole 142.

The area of the interior upper vent hole 141 may be larger than the area of the interior lower vent hole 142.

In other words, since the interior upper vent hole 141 is supposed to provide conditioned air to the upper portion in an interior, the discharge flow rate of conditioned air thereof should be secured in comparison to the interior lower vent hole 142 supposed to provide conditioned air to the lower portion in an interior.

Accordingly, the interior upper vent hole 141 is larger in area than the interior lower vent hole 142, whereby the amount of conditioned air that is supplied to each space in an interior can be satisfied.

A bypass channel 121 is formed around the heater 320 in the heat exchange space 120 of the housing 100, so a portion of the air that has passed through the heat exchanger 310 flows through the bypass channel 121 without passing through the heater.

Since the bypass channel 121 is formed around the heater 320, the flow rate of air flowing from the heat exchange space 120 to the outflow space 130 is secured. In other words, a portion of the air that has passed through the heat exchanger 310 flows into the outflow space 130 through the bypass channel 121 without passing through the heater 320, so fluidity of air is improved and a flow rate of conditioned air is also secured.

Meanwhile, as an embodiment of the present disclosure, as shown in FIG. 3, a bypass door 122 is installed in the bypass channel 121, so air that has passed through the heat exchanger 310 can pass through the heater 320 or can be bypassed without passing through the heater 320, depending on whether the bypass door 122 is open.

In other words, since the bypass door 122 is installed in the bypass channel 121, when the bypass door 122 opens the bypass channel 121, a portion of the air that has passed through the heat exchanger 310 bypasses the heater 320 through the bypass channel 121 and flows into the outflow space 130. Further, when the bypass door 122 closes the bypass channel 121, all the air that has passed through the heat exchanger 310 can pass through the heat exchanger 320. Accordingly, depending on whether the bypass door 122 is open, fluidity of the air flowing from the heat exchange space 120 to the outflow space 130 can be improved, or all the air that has passed through the heat exchanger 310 can flow to the heater 320 and the efficiency of heating conditioned air by the heater 320 can be increased.

Meanwhile, the opening-closing door 400 may include a first door 410 rotatably installed in the interior upper vent hole 141 and a second door 420 rotatably installed in the interior lower vent hole 142.

When the first door 410 is open, the conditioned air flows to the interior upper vent hole 141, and when the first door 410 is closed, the conditioned air does not flow to the interior upper vent hole 141. Further, the conditioned air flows to the interior lower vent hole 142 when the second door 420 is open, and the conditioned air does not flow to the interior lower vent hole 142 when the second door 420 is closed.

The bypass door 122, the first door 410, and the second door 420 each have an actuator, so opening-closing positions of the doors are adjusted by operation of the actuators, respectively. The actuators can be controlled by a controller. The controller can selectively control the actuators in accordance with an interior air-conditioning temperature, an interior air-conditioning position, etc.

Accordingly, the positions of the bypass door 122 and the opening-closing door 400 can be adjusted for respective modes by control of the controller in the present disclosure.

In detail, as illustrated in FIG. 4, when conditioned air is supposed to be supplied to the interior upper vent hole 141, the first door 410 of the opening-closing door 400 is opened and the second door 420 is closed. Accordingly, since the first door 410 is open, the conditioned air of which the temperature has been adjusted through the heat exchange unit 300 in the heat exchange space 120 of the housing 100 can be discharged to the upper space in an interior through the interior upper vent hole 141.

Further, as illustrated in FIG. 5, when conditioned air is supposed to be supplied to the interior lower vent hole 142, the first door 410 of the opening-closing door 400 is closed and the second door 420 is opened. Accordingly, since the second door 420 is open, the conditioned air of which the temperature has been adjusted through the heat exchange unit 300 in the heat exchange space 120 of the housing 100 can be discharged to the lower space in an interior through the interior lower vent hole 142.

Meanwhile, as illustrated in FIG. 6, when conditioned air is supposed to be supplied to both the interior upper vent hole 141 and the interior lower vent hole 142, the first door 410 and the second door 420 are both opened. When the first door 410 and the second door 420 are both opened, the conditioned air of which the temperature has been adjusted through the heat exchange unit 300 in the heat exchange space 120 of the housing 100 can be discharged to both the upper space and the lower space in an interior through the interior upper vent hole 141 and the interior lower vent hole 142. A discharge flow rate of air can be adjusted in accordance with the opening amounts of the first door 410 and the second door 420.

Meanwhile, the bypass door 122 can be opened when conditioned air cooled through the heat exchange unit 310 is supplied, and the bypass door 122 can be closed when conditioned air heated through the heater 320 is supplied.

In other words, when cooled conditioned air is supposed to be supplied into an interior, the bypass door 122 is opened, so a portion of the air is cooled through the heat exchanger 310 and then flows to the outflow space 130 through the heater 320 and the other of the air bypasses the heat exchanger 310 through the bypass channel 121 and then flows to the outflow space 130. Accordingly, fluidity of conditioned air in the housing 100 is improved.

When the heater 320 is operated to increase the temperature of conditioned air, the bypass channel 121 is closed, so all the air that has passed through the heat exchanger 310 passes through the heater 320, whereby the efficiency of heating conditioned air is increased.

As described above, according to an embodiment of the present disclosure, it is possible to provide conditioned air to every position in an interior in respective modes and adjust the temperature of the conditioned air by adjusting the opening amounts of the bypass door 122, the first door 410, and the second door 420.

Meanwhile, according to another embodiment of the present disclosure, it is possible to efficiently provide conditioned air in respective modes using only one opening-closing door 400.

In detail, as shown in FIGS. 7 to 8, the outflow space 130 of the housing 100 is formed such that the width of the portion connected to the heat exchange space 120 gradually decreases, so the air that has passed through the heat exchange space 120 can converge on the center, and the other section of the outflow space 130 may be curved.

Accordingly, the conditioned air of which the temperature has been adjusted through the heat exchange unit 300 in the heat exchange space 120 of the housing 100 converges on the center of the outflow space 130 along the shape of the inlet of the outflow space 130. In other words, since the inlet of the outflow space 130 is formed in a shape of which the width gradually decreases, the air that has passed through the heat exchange space 120 converges on the center along the shape of the outflow space 130, whereby the conditioned air that has passed through the heater 320 and the conditioned air that has passed through the bypass channel 121 can be joined and mixed in the outflow space 130.

Further, since a partial section of the outflow space 130 is curved in a circular shape, the conditioned air that has passed through the heat exchange space 120 is mixed well in the center area of the outflow space 130, so it is easy to adjust the temperature of the conditioned air that has passed through the heater 320 and the bypass channel 121.

When the conditioned air that has passed through the heat exchange space 120 flows to any one of the interior upper vent hole 141 and the interior lower vent hole 142, a flow resistance of air decreases because air flows along the curved shape of the outflow space 130, so fluidity of the air flowing to the interior upper vent hole 141 or the interior lower vent hole 142 is improved.

The portion between the interior upper vent hole 141 and the interior lower vent hole 142 in the outflow space 130 of the housing 100 is an unnecessary space in flow of conditioned air. Accordingly, the portion between the interior upper vent hole 141 and the interior lower vent hole 142 may be made flat, may be formed with a relatively small curvature, or may be concavely formed so that the unnecessary space between the interior upper vent hole 141 and the interior lower vent hole 142 is reduced.

Meanwhile, a guide 131 extends toward the outflow space 130 between the heater 320 and the bypass channel 121 in the housing 100. The guide 131 comes in contact with the opening-closing door 400 when the opening-closing door 400 is positioned to close the bypass channel 121.

As described above, since the guide 131 extends from an end of the heater 320 in the housing 100, the conditioned air that has passed through the heater 320 is prevented from moving to the bypass channel 121.

In other words, since the flow rate of the conditioned air that has passed through the heater 320 is larger than the flow rate of the conditioned air that has passed through the bypass channel 121, the conditioned air that has passed through the heater 320 may flow backward to the bypass channel 121. Accordingly, the guide 131 is formed between the heater 320 and the bypass channel 121 in the housing 100, whereby the conditioned air that has passed through the heater 320 can be guided to the outflow space 130 and the air that has passed through the bypass channel 121 can also smoothly flow to the outflow space 130.

Since the guide 131 is formed to come in contact with the opening-closing door 400, when the opening-closing door 400 is positioned to close the bypass channel 121, airflow between the opening-closing door 400 and the guide 131 can be prevented.

Further, the guide 131 extends to curve along the external shape of the outflow space 130 between the heater 320 and the bypass channel 121, and thus interference with the opening-closing door 400 can be avoided. Further, the conditioned air that has passed through the heater 320 flows along the curved shape of the guide 131, so air resistance can be reduced.

Meanwhile, an opening-closing door 400 according to another embodiment of the present disclosure may include a rotary shaft 430 rotatably installed in the outflow space 130, and a first baffle 440 and a second baffle 450 that are hollow to pass air and are coupled to the rotary shaft 430 at a predetermined distance therebetween.

In other words, one opening-closing door 400 is disposed in the outflow space 130, and the opening-closing door 400 includes a first baffle 440 and a second baffle 450 that are coupled to a rotary shaft 430. The rotary shaft 430 is rotatably installed in the outflow space 130 of the housing 100, and the first baffle 440 and the second baffle 450 are coupled to the rotary shaft 430 and are moved by rotation of the rotary shaft 430. Accordingly, the opening-closing door 400 can selectively open and close the interior upper vent hole 141, the interior lower vent hole 142, and the bypass channel 121 using the first baffle 440 and the second baffle 450, depending on the rotation position of the rotary shaft 430.

The first baffle 440 and the second baffle 450 may be formed in arc shapes to fit to the shape of the outflow space 130 of the housing 100 and may be hollows, so air can flow through them. Accordingly, when the first baffle 440 and the second baffle 450 are matched to the interior upper vent hole 141 and the interior lower vent hole 142, the opening-closing door 400 can selectively close the matched portions, and air flows through the holes in the baffles, so conditioned air can flow to open ones of the interior upper vent hole 141, the interior lower vent hole 142, and the bypass channel 121.

In detail, the opening-closing door 400 may be configured such that the second baffle 450 closes the interior lower vent hole 142 and opens the bypass channel 121 when the first baffle 440 opens the interior upper vent hole 141, and the second baffle 450 opens the interior lower vent hole 142 and closes the bypass channel 121 when the first baffle 440 closes the interior upper vent hole 141, and the bypass channel 121 is closed when the first baffle 440 and the second baffle 450 partially open the interior upper vent hole 141 and the interior lower vent hole 142, respectively.

As illustrated in FIG. 8, in the outflow space 130 of the housing 100, the bypass channel 121 and the interior lower vent hole 142 are positioned adjacent to each other, and the interior upper vent hole 141 is positioned at the opposite side.

Accordingly, the opening-closing door 400 is configured such that the first baffle 440 opens and closes the interior upper vent hole 141 and the second baffle 450 opens and closes the interior lower vent hole 142 and the bypass channel 121.

In other words, the opening-closing door 400 is configured such that when the first baffle 440 opens the interior upper vent hole 141, the second baffle 450 closes the interior lower vent hole 142 and opens the bypass channel 121, conditioned air bypassed through the bypass channel 121 flows to the interior upper vent hole 141 that requires a large flow rate of conditioned air, whereby it is possible to secure a flow rate of conditioned air flowing to the upper space in an interior.

The opening-closing door 400 may be configured such that the second baffle 450 opens the interior lower vent hole 142 and closes the bypass channel 121 when the first baffle 440 closes the interior upper vent hole 141, and the bypass channel 121 is closed when the first baffle 440 and the second baffle 450 partially open the interior upper vent hole 141 and the interior lower vent hole 142, respectively.

Accordingly, an appropriate amount of conditioned air can be provided to the interior lower vent hole 142 that requires a small flow rate of air in comparison to the interior upper vent hole 141, and as the bypass channel 121 is closed, it is possible to secure efficiency of adjusting the temperature of the conditioned air that has passed through the heater 320.

The opening-closing door 400 has an actuator at the rotary shaft 430, so the position of the rotary shaft 430 is adjusted by operation of the actuator. The actuator can be controlled by a controller, and the controller can selectively control each of actuators in accordance with an interior air-conditioning temperature, an interior air-conditioning position, etc.

Accordingly, the positions of the bypass door 122 and the opening-closing door 400 can be adjusted for respective modes by control of the controller in the present disclosure.

In detail, as illustrated in FIG. 9, when conditioned air is supposed to be supplied to the interior upper vent hole, the opening-closing door 400 is adjusted to a position at which the first baffle 440 opens the interior upper vent hole 141 and the second baffle 450 closes the interior lower vent hole 142, whereby the bypass channel 121 is opened.

Accordingly, since the first baffle 440 opens the interior upper vent hole 141 and the second baffle 450 closes the interior lower vent hole 142, the conditioned air of which the temperature has been adjusted through the heat exchange unit 300 in the heat exchange space 120 of the housing 100 can be discharged to the upper space in an interior through the interior upper vent hole 141. Further, since the bypass channel 121 is open, a portion of the conditioned air that has passed through the heat exchanger 310 bypasses the heater 320 through the bypass channel 121 and then flows to the outflow space 130, whereby the flow rate of the conditioned air flowing to the interior upper vent hole 141 increases.

As illustrated in FIG. 10, when conditioned air is supposed to be supplied to the interior lower vent hole, the first baffle 440 is moved to close the interior upper vent hole 141 and second baffle 450 is moved to open the interior lower vent hole 142, whereby the bypass channel 121 is closed.

Accordingly, since the first baffle 440 closes the interior upper vent hole 141 and the second baffle 450 opens the interior lower vent hole 142, the conditioned air of which the temperature has been adjusted through the heat exchange unit 300 in the heat exchange space 120 of the housing 100 can be discharged to the lower space in an interior through the interior lower vent hole 142. Further, since the bypass channel 121 is closed, the conditioned air that has passed through the heat exchanger 310 and the heater 320 is prevented from excessively flowing to the lower space in an interior.

Meanwhile, as illustrated in FIG. 11, when air is supposed to be supplied to both the interior upper vent hole 141 and the interior lower vent hole 142, the first baffle 440 and the second baffle 450 of the opening-closing door 400 are positioned to partially open the interior upper vent hole 141 and the interior lower vent hole 142, respectively, and the bypass channel 121 is closed.

Accordingly, a portion of the conditioned air of which the temperature has been adjusted through the heat exchange unit 300 in the heat exchange space 120 of the housing 100 can be discharged to the upper space in an interior through the interior upper vent hole 141 and the other of the air can be discharged to the lower space in the interior through the interior lower vent hole 142. In particular, when conditioned air flows to both the interior upper vent hole 141 and the interior lower vent hole 142, the conditioned air that has passed through the heater 320 is prevented from flowing to the bypass channel 121 because the bypass channel 121 is closed by the second baffle 450. Further, since all the conditioned air passes through the heat exchanger 310 and the heater 320, efficiency of adjusting temperature is improved.

As described above, according to another embodiment of the present disclosure, by adjusting the rotation position of one opening-closing door 400, it is possible to provide conditioned air to every position in an interior in respective modes and adjust the temperature of conditioned air. Further, since only one actuator is provided to adjust the rotation position of the opening-closing door 400, the manufacturing cost and the weight are reduced.

According to the air conditioning device for a vehicle having the structure described above, the number of doors for adjusting the temperature of conditioned air in respective modes is reduced and flow resistance of air is reduced by improving airflow.

Although the present disclosure was provided above in relation to specific embodiments shown in the drawings, it is apparent to those having ordinary skill in the art that the present disclosure may be changed and modified in various ways without departing from the scope of the present disclosure.

What is claimed is:
1. An air conditioning device for a vehicle, comprising:
    a housing having an inside divided into an inflow space, a heat exchange space, and an outflow space, which are straightly arranged, and having a plurality of discharge ports, which communicates with an interior, at the outflow space;
    a blowing unit disposed at the inflow space of the housing and configured to blow air;

a heat exchange unit disposed at the heat exchange space of the housing and configured to adjust a temperature of conditioned air by exchanging heat with air; and at least one opening-closing door disposed at the outflow space of the housing and configured to open and close the plurality of discharge ports such that conditioned air at an adjusted temperature selectively flows to the plurality of discharge ports, wherein the outflow space of the housing is formed such that a width of a portion connected to the heat exchange space gradually decreases, such that air that has passed through the heat exchange space converges on a center, and another section of the outflow space is curved.

2. The air conditioning device of claim 1, wherein the inflow space is formed such that a cross-sectional area at an outlet is smaller than a cross-sectional area at an inlet, and a filter is disposed at the inlet.

3. The air conditioning device of claim 1, wherein the heat exchange unit includes a heat exchanger and a heater and a cooling medium configured to circulate in the heat exchanger, such that a temperature of conditioned air is adjusted by heat exchange between the cooling medium and air, and the heater is configured to increase a temperature of conditioned air by generating heat.

4. The air conditioning device of claim 3, wherein the heat exchanger is installed diagonally at an angle in the heat exchange space.

5. The air conditioning device of claim 3, wherein:

the plurality of discharge ports of the housing include an interior upper vent hole and an interior lower vent hole, and the interior upper vent hole and the interior lower vent hole are spaced apart from each other in opposite directions from a center of the outflow space.

6. The air conditioning device of claim 5, wherein an area of the interior upper vent hole is larger than an area of the interior lower vent hole.

7. The air conditioning device of claim 5, wherein:

a bypass channel is formed around the heater in the heat exchange space of the housing, and a portion of air that has passed through the heat exchanger flows through the bypass channel without passing through the heater.

8. The air conditioning device of claim 7, wherein:

a bypass door is installed in the bypass channel, and air that has passed through the heat exchanger is bypassed without passing through the heater when the bypass door is open.

9. The air conditioning device of claim 8, wherein the bypass door is opened when conditioned air flows cooled through the heat exchanger is supplied, and is closed when conditioned air heated through the heater is supplied.

10. The air conditioning device of claim 5, wherein the at least one opening-closing door includes a first door rotatably installed in the interior upper vent hole and a second door rotatably installed in the interior lower vent hole.

11. The air conditioning device of claim 10, wherein:

the first door is opened and the second door is closed when conditioned air is supposed to be supplied to the interior upper vent hole, the first door is closed and the second door is opened when conditioned air is supposed to be supplied to the interior lower vent hole, and the first door and the second door are both opened when conditioned air is supposed to be supplied to both the interior upper vent hole and the interior lower vent hole.

12. The air conditioning device of claim 7, wherein a guide extends toward the outflow space between the heater and the bypass channel in the housing, and the guide comes into contact with the at least one opening-closing door when the at least one opening-closing door is positioned to close the bypass channel.

13. The air conditioning device of claim 12, wherein the guide extends to curve along an external shape of the outflow space between the heater and the bypass channel.

14. The air conditioning device of claim 7, wherein the at least one opening-closing door includes a rotary shaft rotatably installed in the outflow space, and a first baffle and a second baffle that are hollow to pass air and coupled to the rotary shaft at a predetermined distance therebetween.

15. The air conditioning device of claim 14, wherein:

the at least one opening-closing door is configured such that the second baffle closes the interior lower vent hole and opens the bypass channel when the first baffle opens the interior upper vent hole, the second baffle opens the interior lower vent hole and closes the bypass channel when the first baffle closes the interior upper vent hole, and the bypass channel is closed when the first baffle and the second baffle partially open the interior upper vent hole and the interior lower vent hole, respectively.

16. The air conditioning device of claim 14, wherein when conditioned air is supposed to be supplied to the interior upper vent hole, the at least one opening-closing door is adjusted to a position at which the first baffle opens the interior upper vent hole and the second baffle closes the interior lower vent hole, whereby the bypass channel is opened.

17. The air conditioning device of claim 14, wherein when conditioned air is supposed to be supplied to the interior lower vent hole, the at least one opening-closing door is adjusted to a position at which the first baffle closes the interior upper vent hole and the second baffle opens the interior lower vent hole, whereby the bypass channel is closed.

18. The air conditioning device of claim 14, wherein when conditioned air is supposed to be supplied to both the interior upper vent hole and the interior lower vent hole, the at least one opening-closing door is adjusted to a position at which the first baffle and the second baffle partially open the interior upper vent hole and the interior lower vent hole, respectively, and the bypass channel is closed.

* * * * *